United States Patent [19]

Meyer

[11] Patent Number: 5,149,407
[45] Date of Patent: * Sep. 22, 1992

[54] PROCESS AND APPARATUS FOR THE PRODUCTION OF FUEL GAS AND THE ENHANCED RELEASE OF THERMAL ENERGY FROM SUCH GAS

[76] Inventor: Stanley A. Meyer, 3792 Broadway, Grove City, Ohio 43123

[*] Notice: The portion of the term of this patent subsequent to Jun. 26, 2007 has been disclaimed.

[21] Appl. No.: 460,859
[22] PCT Filed: Jun. 15, 1989
[86] PCT No.: PCT/US89/02622
§ 371 Date: Feb. 13, 1990
§ 102(e) Date: Feb. 13, 1990
[87] PCT Pub. No.: WO89/12704
PCT Pub. Date: Dec. 28, 1989

Related U.S. Application Data

[63] Continuation-in-part of Ser. No. 207,730, Jun. 16, 1988, Pat. No. 4,936,961, which is a continuation-in-part of Ser. No. 81,859, Aug. 5, 1987, Pat. No. 4,826,581.

[51] Int. Cl.$^5$ ............................................. C07G 13/00
[52] U.S. Cl. ..................... 204/157.41; 204/157.5; 204/157.52; 204/193
[58] Field of Search ........... 204/157.41, 157.5, 157.52, 204/164, 193

[56] References Cited

U.S. PATENT DOCUMENTS

| | | | |
|---|---|---|---|
| 3,772,180 | 11/1973 | Prestidge | 204/305 |
| 4,511,450 | 4/1985 | Neefe | 204/278 |
| 4,696,809 | 9/1987 | Vialaron et al. | 204/157.52 X |
| 4,740,283 | 4/1988 | Laas et al. | 204/182.8 |
| 4,826,581 | 5/1989 | Meyer | 204/157.41 |
| 4,936,961 | 6/1990 | Meyer | 204/157.5 |

OTHER PUBLICATIONS

*Chemical Abstracts* vol. 88, NO. 52526n, 1978 (Hasebe).
*Chemical Abstracts* vol. 77, No. 156261m, 1972 (Zubrilov et al.).

Primary Examiner—Stephen J. Kalafut
Attorney, Agent, or Firm—Porter, Wright, Morris & Arthur

[57] ABSTRACT

Water molecules are broken down into hydrogen and oxygen gas atoms in a capacitive cell by a polarization and resonance process dependent upon the dielectric properties of water and water molecules. The gas atoms are thereafter ionized or otherwise energized and thermally combusted to release a degree of energy greater than that of combustion of the gas in ambient air.

12 Claims, 15 Drawing Sheets

PROCESS AND APPARATUS FOR THE PRODUCTION OF FUEL GAS AND THE ENHANCED RELEASE OF THERMAL ENERGY FROM SUCH GAS

RELATED APPLICATIONS

This is a continuation-in-part of my co-pending application Ser. No. 207,730 filed Jun. 6, 1988, now U.S. Pat. No. 4,936,961, which in turn was a continuation in part of Ser. No. 081,859, filed Aug. 5, 1987, now U.S. Pat. No. 4,826,581.

FIELD OF THE INVENTION

This invention relates to a method of and apparatus for obtaining the release of a fuel gas mixture including hydrogen and oxygen from water and to a method of and apparatus for obtaining the further release of energy from such a fuel gas mixture. Charged ions derived from the fuel gas are stimulated to an activated state, and then passed through a resonant cavity, where successively increasing energy levels are achieved, and finally passed to an outlet orifice to produce thermal explosive energy.

BACKGROUND OF THE PRIOR ART

Numerous processes have been proposed for separating a water molecule into its elemental hydrogen and oxygen components. Electrolysis is one such process. Other processes are described in U.S. patents such as U.S. Pat. Nos. 4,344,831; 4,184,931; 4,023,545; 3,980,053; and Patent Cooperation Treaty Application No. PCT/US80/1362, published Apr. 30, 1981. Other processes have been proposed for many years in which controlled energy producing reactions of atomic particles are expected to occur under "cold" conditions. [See, e.g., Rafelski, J. and Jones, S. E., "Cold Nuclear Fusion," *Scientific American*, July, 1987, page 84].

Further processes are also described in U.S. Pat. Nos. 4,233,109; 4,406,765; 4,687,753 and 4,695,357. The process and apparatus described herein are considered variations to and improvements in fuel sources and processes by which energy is derived from fuel gas components in a controllable manner.

OBJECTS OF THE INVENTION

A first object of the invention is to provide a fuel cell and a process in which molecules of water are broken down into hydrogen and oxygen gases, and a fuel gas mixture including hydrogen, oxygen and other gasses formerly dissolved within the water is produced. A further object of the invention is to realize significant energy-yield from a fuel gas derived from water ($H_2O$) molecules. Molecules of water are broken down into hydrogen and oxygen gases. Electrically charged hydrogen and oxygen ions of opposite electrical polarity are activated by electromagnetic wave energy and exposed to a high temperature thermal zone. Significant amounts of thermal energy with explosive force beyond the gas burning stage are released.

An explosive thermal energy under a controlled state is produced. The process and apparatus provide a heat energy source useful for power generation, aircraft, rocket engines, or space stations.

DESCRIPTION OF THE PREFERRED EMBODIMENT

Figure 1:
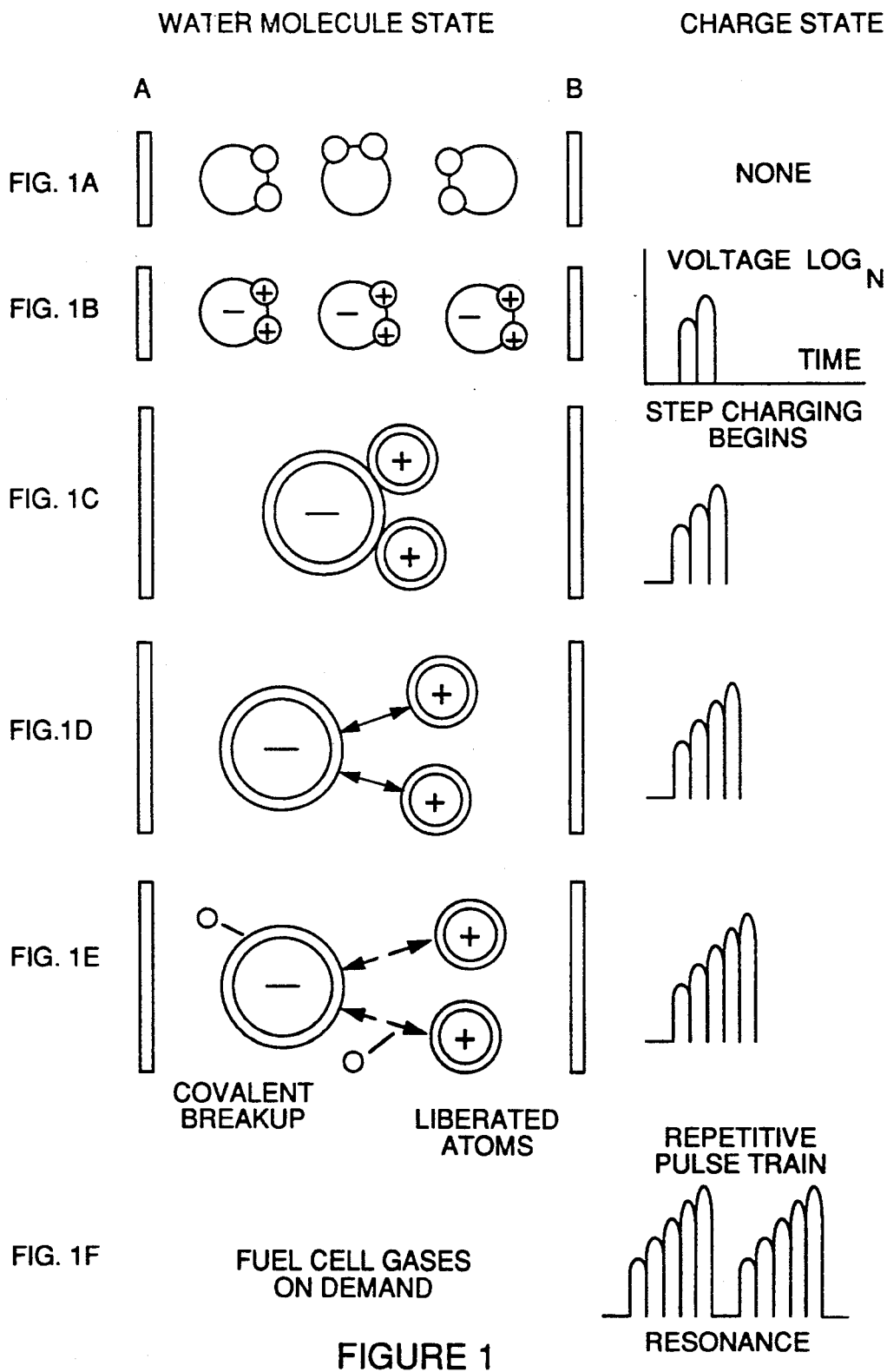
FIGS. 1A through 1F are illustrations depicting the theoretical bases for phenomena encountered during operation of the fuel gas production stage of the invention herein.

A fuel gas is produced by a hydrogen fracturing process that follows the sequence of steps shown in the following Table I. Beginning with water molecules, the molecule is subjected to successively increasing electrical, wave energy and thermal forces. In the succession of forces, radomly oriented water molecules are aligned with respect to molecular polar orientation and themselves polarized and "elongated" by the application of an electric potential to the extent that covalent bonding of the water molecule is so weakened that the atoms disassociate and the molecule breaks down into hydrogen and oxygen elemental components. The released atomic gases are next ionized and electrically charged in a vessel while being subjected to a further energy source that promotes inter-particle impact in the gas at an increased overall energy level. Finally, the atomic particles in the excited gas, having achieved successively higher energy levels, are subjected to a laser or electromagnetic wave energy source that produces atomic destabilization and the final release of thermal explosive energy. Engineering design parameters based on known theoretical principles of atomic physics determine the incremental levels of electrical and wave energy input required to produce resonance in each stage of the system. Instead of a dampening effect, a resonant energization of the molecule, atom or ion provides a compounding energy interaction resulting in the final energy release.

TABLE I

| PROCESS STEPS LEADING TO IGNITION | |
|---|---|
| RELATIVE STATE OF WATER MOLECULE AND/OR HYDROGEN/OXYGEN/OTHER ATOMS | 1st Stage |
| RANDOM (AMBIENT STATE) ALIGNMENT OF POLAR FIELDS POLARIZATION OF MOLECULES | Water to Gas |

TABLE I-continued
PROCESS STEPS LEADING TO IGNITION

| | |
|---|---|
| MOLECULAR ELONGATION | |
| ATOM LIBERATION BY | |
| BREAKDOWN OF COVALENT BOND | |
| | 2nd Stage |
| RELEASE OF GASES | Gas Ionization |
| LIQUID TO GAS IONIZATION | |
| ELECTRICAL CHARGING EFFECT | |
| PARTICLE IMPACT | |
| | 3rd Stage |
| ELECTROMAGNETIC WAVE, LASER | Priming |
| OR PHOTON INJECTION | |
| ELECTRON EXTRACTION | |
| ATOMIC DESTABILIZATION | |
| | Final Stage |
| THERMAL IGNITION | Ignition |

In brief, in the first stage a gas mixture including hydrogen and oxygen and other dissolved gases formerly entrapped in water is obtained, from water. In general, the method used in the first stage consists of: (A) providing a capacitor, in which the water is included as a dielectric liquid between capacitor plates, in a resonant charging choke circuit that includes an inductance in series with the capacitor; (B) subjecting the capacitor to a pulsating, unipolar electric voltage field in which the polarity does not pass beyond an arbitrary ground, whereby the water molecules within the capacitor are subjected to a charge of the same polarity and the water molecules are distended by their subjection to electrical polar forces; (C) further subjecting the water in said capacitor to said pulsating electric field to achieve a pulse frequency such that the pulsating electric field induces a resonance within the water molecule; (D) continuing the application of the pulsing frequency to the capacitor cell after resonance occurs so that the energy level within the molecule is increased in cascading incremental steps in proportion to the number of pulses; (E) maintaining the charge of said capacitor during the application of the pulsing field, whereby the co-valent electrical bonding of the hydrogen and oxygen atoms within said molecules is destabilized such that the force of the electrical field applied, as the force is effective within the molecule, exceeds the bonding force of the molecule, and hydrogen and oxygen atoms are liberated from the molecule as elemental gases; and (F) collecting said hydrogen and oxygen gases, and any other gases that were formerly dissolved within the water, and discharging the collected gases as a fuel gas mixture.

The water molecules are subjected to increasing electrical forces. In an ambient state, randomly oriented water molecules are aligned with respect to a molecular polar orientation. They are next, themselves polarized and "elongated" by the application of an electric potential to the extent that covalent bonding of the water molecule is so weakened that the atoms disassociate and the molecule breaks down into hydrogen and oxygen elemental components. In the process, the point of optimum gas release is reached at a circuit resonance. Water in the fuel cell is subjected to a pulsating, polar electric field produced by the electrical circuit whereby the water molecules are distended by reason of their subjection to electrical polar forces of the capacitor plates. The polar pulsating frequency applied is such that the pulsating electric field induces a resonance in the molecule. A cascade effect occurs and the overall energy level of specific water molecules is increased in cascading, incremental steps. The hydrogen and oxygen atomic gases, and other gas components formerly entrapped as dissolved gases in water, are released when the resonant energy exceeds the co-valent bonding force of the water molecule. A preferred construction material for the capacitor plates is a stainless steel T-304 which is non-chemically reactive with water, hydrogen, or oxygen. An electrically conductive material which is inert in the fluid environment is a desirable material of construction for the electric field plates of the "water capacitor" employed in the circuit.

Once triggered, the gas output is controllable by the attenuation of operational parameters. Thus, once the frequency of resonance is identified, by varying the applied pulse voltage to the water fuel cell assembly, gas output is varied. By varying the pulse shape and/or amplitude or pulse train sequence of the initial pulsing wave source, final gas output is varied. Attenuation of the voltage field frequency in the form of OFF and ON pulses likewise affects output.

The overall apparatus thus includes an electrical circuit in which a water capacitor having a known dielectric property is an element. The fuel gases are obtained from the water by the disassociation of the water molecule. The water molecules are split into component atomic elements (hydrogen and oxygen gases) by a voltage stimulation process called the electrical polarization process which also releases dissolved gases entrapped in the water.

From the outline of physical phenomena associated with the first stage of the process described in Table 1, the theoretical basis of the invention considers the respective states of molecules and gases and ions derived from liquid water. Before voltage stimulation, water molecules are randomly dispersed throughout water within a container. When a unipolar voltage pulse train such as shown in FIGS. 1B through 1F is applied to positive and negative capacitor plates, an increasing voltage potential is induced in the molecules in a linear, step-like charging effect. The electrical field of the particles within a volume of water including the electrical field plates increases from a low energy state to a high energy state successively in a step manner following each pulse-train as illustrated figuratively in the depictions of FIGS. 1A through 1F. The increasing voltage potential is always positive in direct relationship to negative ground potential during each pulse. The voltage polarity on the plates which create the voltage fields remains constant although the voltage charge increases. Positive and negative voltage "zones" are thus formed simultaneously in the electrical field of the capacitor plates.

In the first stage of the process describe in Table 1, because the water molecule naturally exhibits opposite electrical fields in a relatively polar configuration (the two hydrogen atoms are positively electrically charged relative to the negative electrically charged oxygen atom), the voltage pulse causes initially randomly oriented water molecules in the liquid state to spin and orient themselves with reference to positive and negative poles of the voltage fields applied. The positive electrically charged hydrogen atoms of said water molecule are attracted to a negative voltage field; while, at the same time, the negative electrically charged oxygen atoms of the same water molecule are attracted to a positive voltage field. Even a slight potential difference applied to inert, conductive plates of a containment chamber which forms a capacitor will initiate polar atomic orientation within the water molecule based on polarity differences.

When the potential difference applied causes the orientated water molecules to align themselves between the conductive plates, pulsing causes the voltage field intensity to be increased in accordance with FIG. 1B. As further molecular alignment occurs, molecular movement is hindered. Because the positively charged hydrogen atoms of said aligned molecules are attracted in a direction opposite to the negatively charged oxygen atoms, a polar charge alignment or distribution occurs within the molecules between said voltage zones, as shown in FIG. 1B. And as the energy level of the atoms subjected to resonant pulsing increases, the stationary water molecules become elongated as shown in FIGS. 1C and 1D. Electrically charged nuclei and electrons are attracted toward opposite electrically charged voltage zones—disrupting the mass and charge equilibrium of the water molecule.

As the water molecule is further exposed to an increasing potential difference resulting from the step charging of the capacitor, the electrical force of attraction of the atoms within the molecule to the capacitor plates of the chamber also increases in strength. As a result, the co-valent bonding between atoms which form the molecule is weakened—and ultimately terminated. The negatively charged electron is attracted toward the positively charged hydrogen atoms, while at the same time, the negatively charged oxygen atoms repel electrons.

In a more specific explanation of the "sub-atomic" action that occurs in the water cell that provides a fuel gas for the subsequent stages, it is known that natural water is a liquid which has a dielectric constant of 78.54 at 20° C. and 1 atm pressure. [*Handbook of Chemistry and Physics*, 68th ed., CRC Press (Boca Raton, Fla. (1987–88)), Section E-50, H$_2$O (water)].

When a volume of water is isolated and electrically conductive plates, that are chemically inert in water and are separated by a distance, are immersed in the water, a capacitor is formed, having a capacitance determined by the surface area of the plates, the distance of their separation and the dielectric constant of water.

When water molecules are exposed to voltage at a restricted current, water takes on an electrical charge. By the laws of electrical attraction, molecules align according to positive and negative polarity fields of the molecule and the alignment field. The plates of a capacitor constitute such an alignment field when a voltage is applied.

When a charge is applied to a capacitor, the electrical charge of the capacitor equals the applied voltage charge; in a water capacitor, the dielectric property of water resists the flow of amps in the circuit, and the water molecule itself, because it has polarity fields formed by the relationship of hydrogen and oxygen in the covalent bond, and an intrinsic dielectric property, becomes part of the electrical circuit, analogous to a "microcapacitor" within the capacitor defined by the plates.

Figure 2:
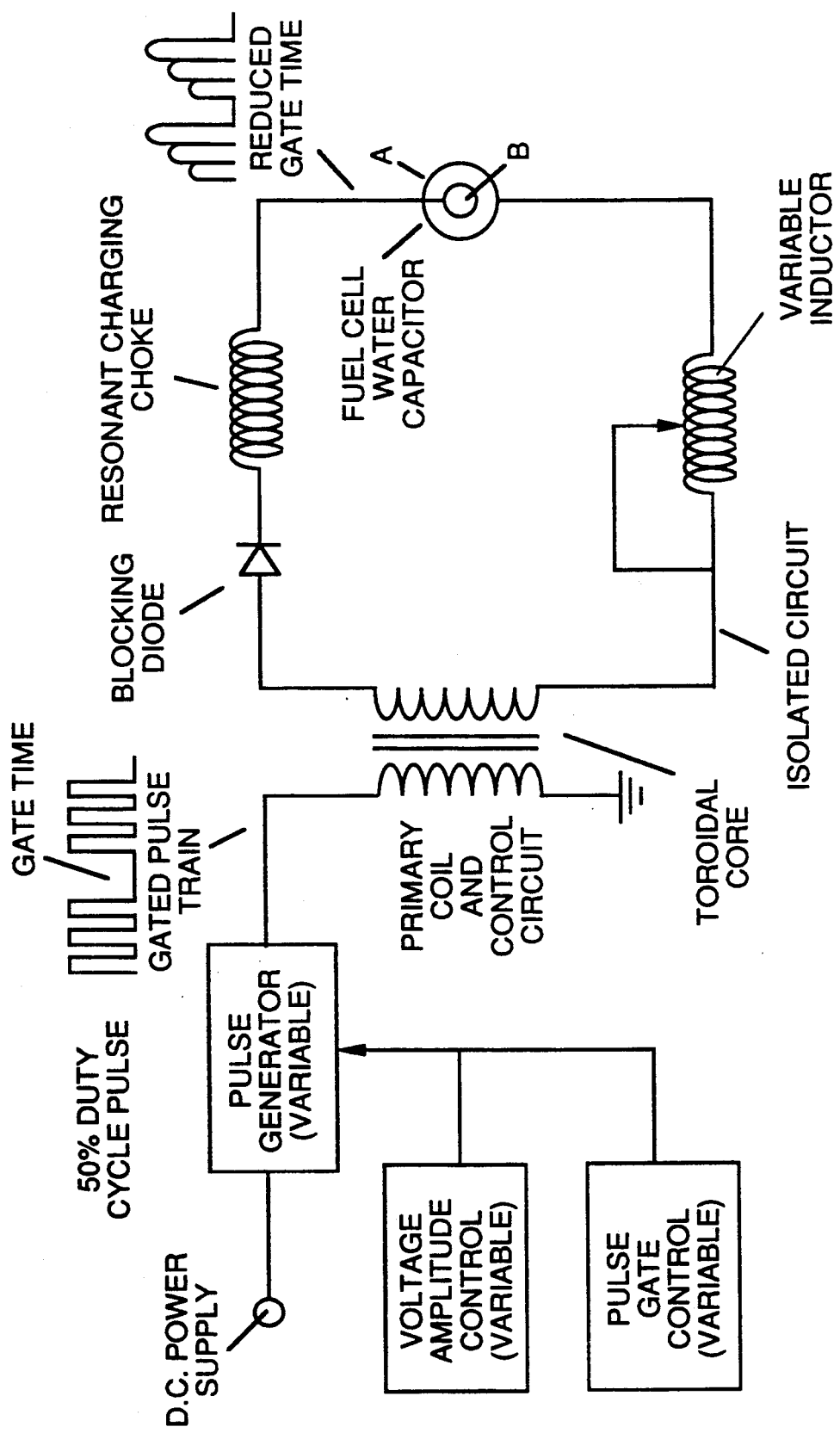
FIG. 2 illustrates a circuit useful in the fuel gas generation process.

In the Example of a fuel cell circuit of FIG. 2, a water capacitor is included. The step-up coil is formed on a conventional torroidal core formed of a compressed ferromagnetic powdered material that will not itself become permanently magnetized, such as the trademarked "Ferramic 06# "Permag" powder as described in *Siemens Ferrites Catalog*, CG-2000-002-121, (Cleveland, Ohio) No. F626-1205. The core is 1.50 inch in diameter and 0.25 inch in thickness. A primary coil of 200 turns of 24 gauge cooper wire is provided and a coil of 600 turns of 36 gauge wire comprises the secondary winding. Other primary/secondary coil winding ratios may be conventionally determined.

Figure 9:
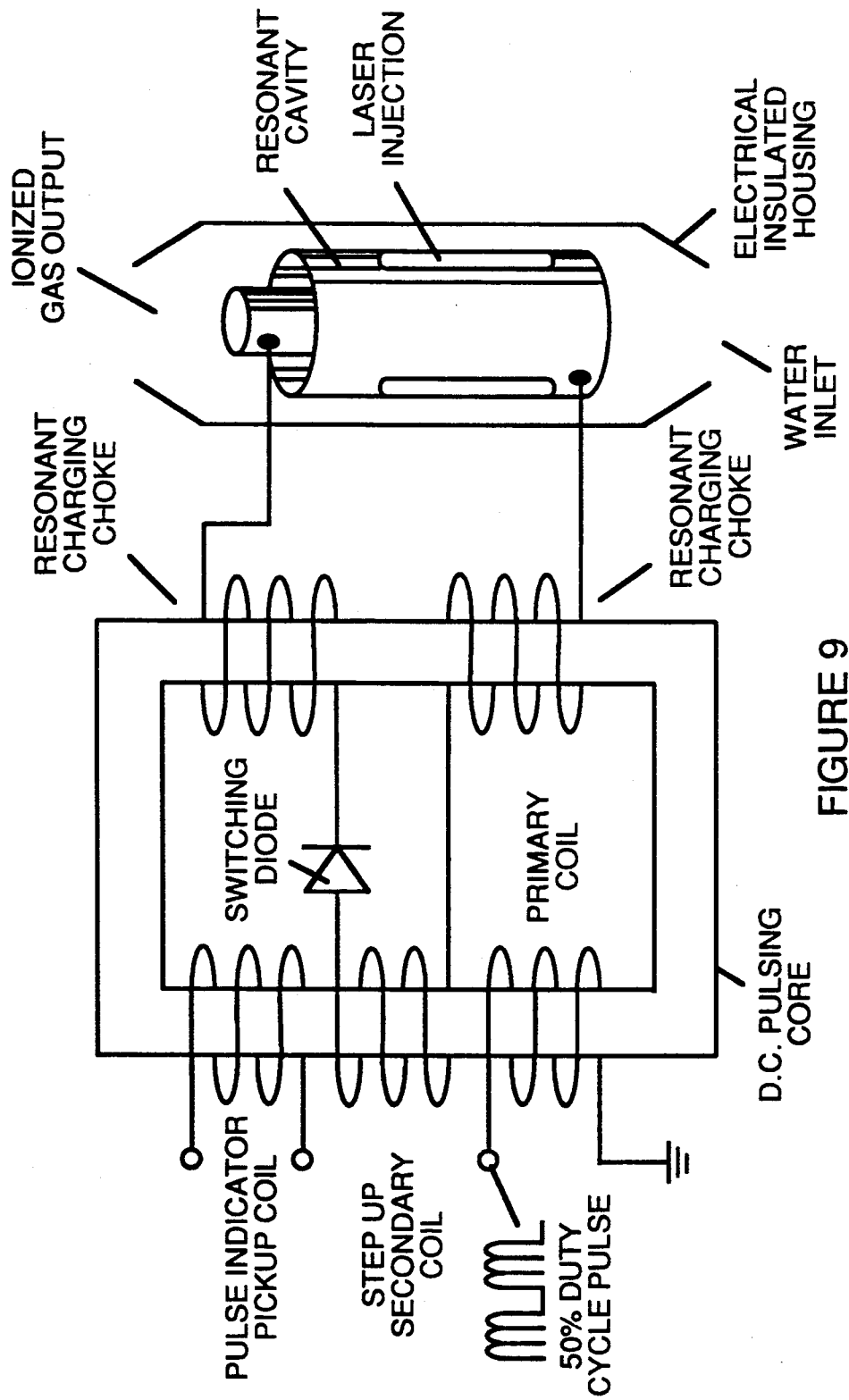
FIG. 9 shows an alternate electrical circuit useful in providing a pulsating waveform to the apparatus.

An alternate coil arrangement using a conventional M27 iron transformer core is shown in FIG. 9. The coil wrap is always in one direction only.

In the circuit of FIG. 2, the diode is a 1N1198 diode which acts as a blocking diode and an electric switch that allows voltage flow in one direction only. Thus, the capacitor is never subjected to a pulse of reverse polarity.

The primary coil of the torroid is subject to a 50% duty cycle pulse. The torroidal pulsing coil provides a voltage step-up from the pulse generator in excess of five times, although the relative amount of step-up is determined by pre-selected criteria for a particular application. As the stepped-up pulse enters first inductor (formed from 100 turns of 24 gauge wire 1 inch in diameter), an electromagnetic field is formed around the inductor, voltage is switched off when the pulse ends, and the field collapses and produces another pulse of the same polarity; i.e., another positive pulse is formed where the 50% duty cycle was terminated. Thus, a double pulse frequency is produced; however, in a pulse train of unipolar pulses, there is a brief time when pulses are not present.

By being so subjected to electrical pulses in the circuit of FIG. 2, water confined in the volume that includes the capacitor plates takes on an electrical charge that is increased by a step charging phenomenon occurring in the water capacitor. Voltage continually increases (to about 1000 volts and more) and the water molecules starts to elongate.

The pulse train is then switched off; the voltage across the water capacitor drops to the amount of charge that the water molecules have taken on, i.e. voltage is maintained across the charged capacitor. The pulse train is then reapplied.

Because a voltage potential applied to a capacitor can perform work, the higher the voltage potential, the more work is performed by a given capacitor. In an optimum capacitor that is wholly non-conductive, zero (0) current flow will occur across the capacitor. Thus, in view of an idealized capacitor circuit, the object of the water capacitor circuit is to prevent electron flow through the circuit, i.e. such as occurs by electron flow or leakage through a resistive element that produces heat. Electrical leakage in water will occur, however, because of some residual conductivity and impurities or ions that may be otherwise present in the water. Thus, the water capacitor is preferably chemically inert. An electrolyte is not added to the water.

In the isolated water bath, the water molecule takes on charge, and the charge increases. The object of the process is to switch off the co-valent bonding of the water molecule and interrupt the sub-atomic force, i.e. the electrical force or electromagnetic force, that binds the hydrogen and oxygen atoms to form a molecule so that the hydrogen and oxygen separate.

Because an electron will only occupy a certain electron shell (the shells are well known) the voltage applied to the capacitor affects the electrical forces inherent in the co-valent bond. As a result of the charge applied by the plates, the applied force becomes greater than the force of the co-valent bonds between the atoms of the water molecule; and the water molecule becomes elongated. When this happens, the time share ratio of the electrons between the atoms and the electron shells is modified.

In the process, electrons are extracted from the water bath; electrons are not consumed nor are electrons introduced into the water bath by the circuit as electrons are conventionally introduced in an electrolysis process. There may nevertheless occur a leakage current through the water. Those hydrogen atoms missing electrons become neutralized; and atoms are liberated from the water. The charged atoms and electrons are attracted to opposite polarity voltage zones created between the capacitor plates. The electrons formerly shared by atoms in the water co-valent bond are reallocated such that neutral elemental gases are liberated.

In the process, the electrical resonance may be reached at all levels of voltage potential. The overall circuit is characterized as a "resonant charging choke" circuit which is an inductor in series with a capacitor that produces a resonant circuit. [*SAMS Modern Dictionary of Electronics*, Rudolff Garff, ©1984, Howard W. Sams & Co. (Indianapolis, Ind.), p. 859.] Such a resonant charging choke is on each side of the capacitor. In the circuit, the diode acts as a switch that allows the magnetic field produced in the inductor to collapse, thereby doubling the pulse frequency and preventing the capacitor from discharging. In this manner a continuous voltage is produced across the capacitor plates in the water bath; and the capacitor does not discharge. The water molecules are thus subjected to a continuously charged field until the breakdown of the co-valent bond occurs.

As noted initially, the capacitance depends on the dielectric properties of the water and the size and separation of the conductive elements forming the water capacitor.

EXAMPLE I

In an example of the circuit of FIG. 2 (in which other circuit element specifications are provided above), two concentric cylinders 4 inches long formed the water capacitor of the fuel cell in the volume of water. The outside cylinder was 0.75 inch in outside diameter; the inner cylinder was 0.5 inch in outside diameter. Spacing from the outside of the inner cylinder to the inner surface of the outside cylinder was 0.0625 inch. Resonance in the circuit was achieved at a 26 volt applied pulse to the primary coil of the torroid at 10 $KH_z$, and the water molecules disassociated into elemental hydrogen and oxygen and the gas released from the fuel cell comprised a mixture of hydrogen, oxygen from the water molecule, and gases formerly dissolved in the water such as the atmospheric gases or oxygen, nitrogen, and argon.

In achieving resonance in any circuit, as the pulse frequency is adjusted, the flow of amps is minimized and voltage is maximized to a peak. Calculation of the resonance frequency of an overall circuit is determined by known means; different cavities have a different frequency of resonance dependent on parameters of the water dielectric, plate size, configuration and distance, circuit inductors, and the like. Control of the production of fuel gas is determined by variation of the period of time between a train of pulses, pulse amplitude and capacitor plate size and configuration, with corresponding value adjustments to other circuit components.

The wiper arm on the second inductor tunes the circuit and accommodates to contaminants in water so that the charge is always applied to the capacitor. The voltage applied determines the rate of breakdown of the molecule into its atomic components. As water in the cell is consumed, it is replaced by any appropriate means or control system.

Thus in the first stage, which is of itself independently useful, a fuel gas mixture is produced having, in general, the components of elemental hydrogen and oxygen as well as formerly dissolved entrapped atmospheric gases such as nitrogen, argon, and the like. The fuel gas is itself combustible in a conventional manner.

After the first stage the gas atoms become elongated during electron removal as the atoms are ionized. Laser, or light wave energy of a predetermined frequency is injected into a containment vessel in a gas ionization process. The light energy absorbed by voltage stimulated gas nuclei causes destabilization of gas ions still further. The absorbed laser energy causes the gas nuclei to increase in energy state, which, in turn, causes electron deflection to a higher orbital shell.

The electrically charged and laser primed combustible gas ions from a gas resonant cavity may be directed into an optical thermal lens assembly for triggering. Before entry into the optimal thermal lens, however, electrons are stripped from the ions and the atom is destabilized. The destabilized gas ions which are electrically and mass unbalanced atoms having highly energized nuclei are pressurized during spark ignition. The unbalanced, destablized atomic components thermally interact; the energized and unstable hydrogen gas nuclei collide with highly energized and unstable oxygen gas nuclei, causing and producing thermal explosive energy beyond the gas burning stage. The ambient air gas components in the initial mixture aid the thermal explosive process under a controlled state.

In the process, the point of optimum energy-yield is reached when the electron deficient oxygen atoms (having less than a normal number of electrons) lock onto and capture a hydrogen atom electron prior to or during thermal combustion of the hydrogen/oxygen mixture. Atomic decay results in the release of energy.

After the first stage, the gas mixture is subjected to a pulsating, polar electric field whereby electrons of the gas atoms are distended in their orbital fields by reason of their subjection to electrical polar forces The polar pulsating frequency applied is such that the pulsating electric field induces a resonance with respect to an electron of the gas atom. A cascade effect results and the energy level of specific resonating electron is increased in cascading, incremental steps.

Next, the gas atoms are ionized and subjected to electro-magnetic wave energy having a predetermined frequency to induce a further election resonance in the ion, whereby the energy level of the election is successively increased. Electrons are extracted from the resonating ions while such ions are in an increased energy state to destabilize the nuclear electron configuration of said ions; and the gas mixture of destablized ions is thermally ignited.

Figure 4:
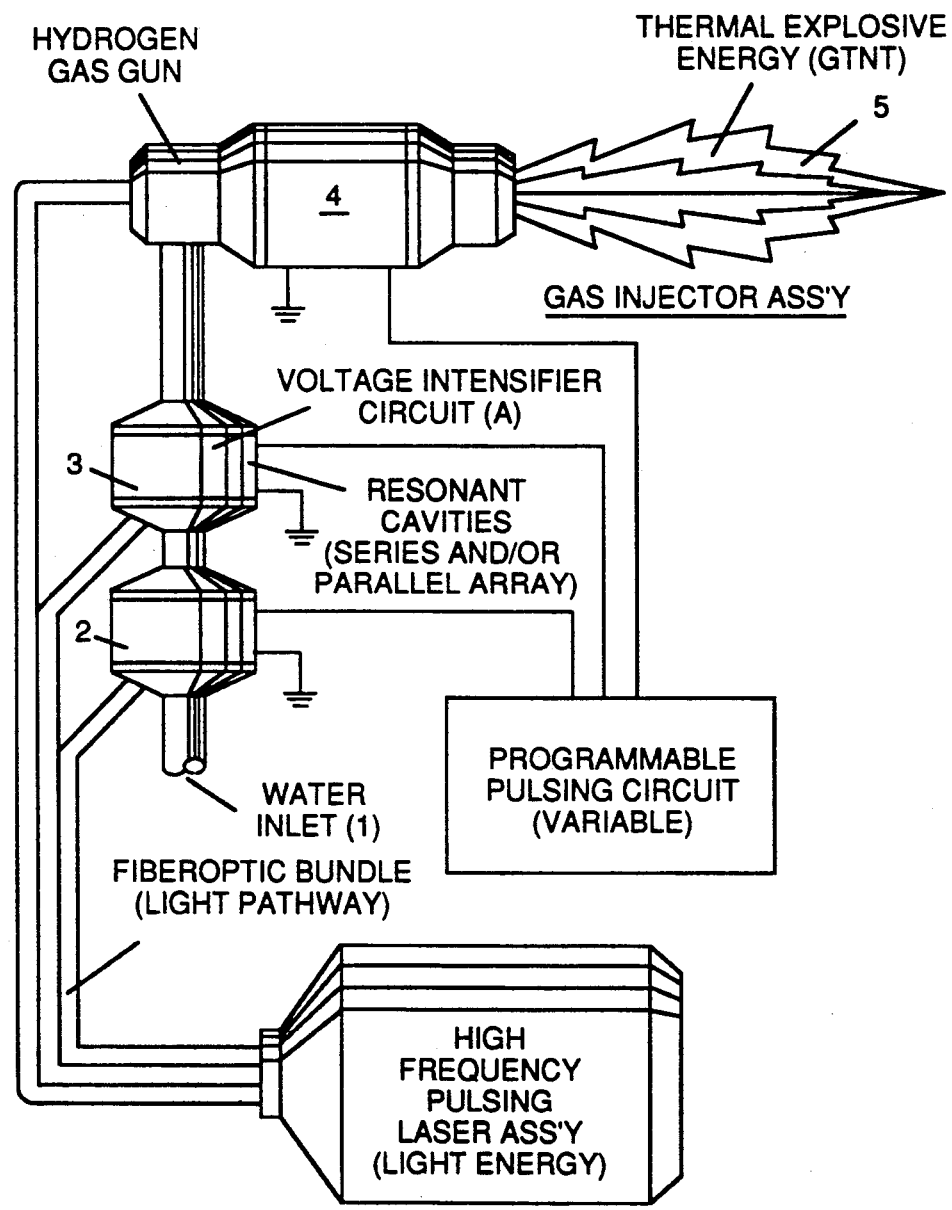
FIG. 4 illustrates a staged arrangement of apparatus useful in the process, beginning with a water inlet and culminating in the production of thermal explosive energy.

In the apparatus shown in FIG. 4, water is introduced at inlet 1 into a first stage water fracturing module 2, such as the water fuel cell described above, in which water molecules are broken down into hydrogen, oxygen and released entrapped gas components. The released atomic gases and other gas components formerly entrapped as dissolved gases in water may be introduced to a successive stage 3 or other number of like resonant cavities, which are arranged in either a series of parallel combined array. The successive energization of the gas atoms provides a cascading effect, successively increasing the voltage stimulation level of the released gasses as they sequentially pass through cavities 2, 3, etc. In a final stage, an injector system 4, of a configuration of the type shown in FIGS. 5A or 5B, receives energized atomic and gas particles where the particles are subjected to further energy input, electrical excitation and thermal stimulation, whereby thermal explosive energy results 5, which may be directed thru a lens assembly of the type shown in FIG. 5C to provide a controlled thermal energy output.

Figure 3:
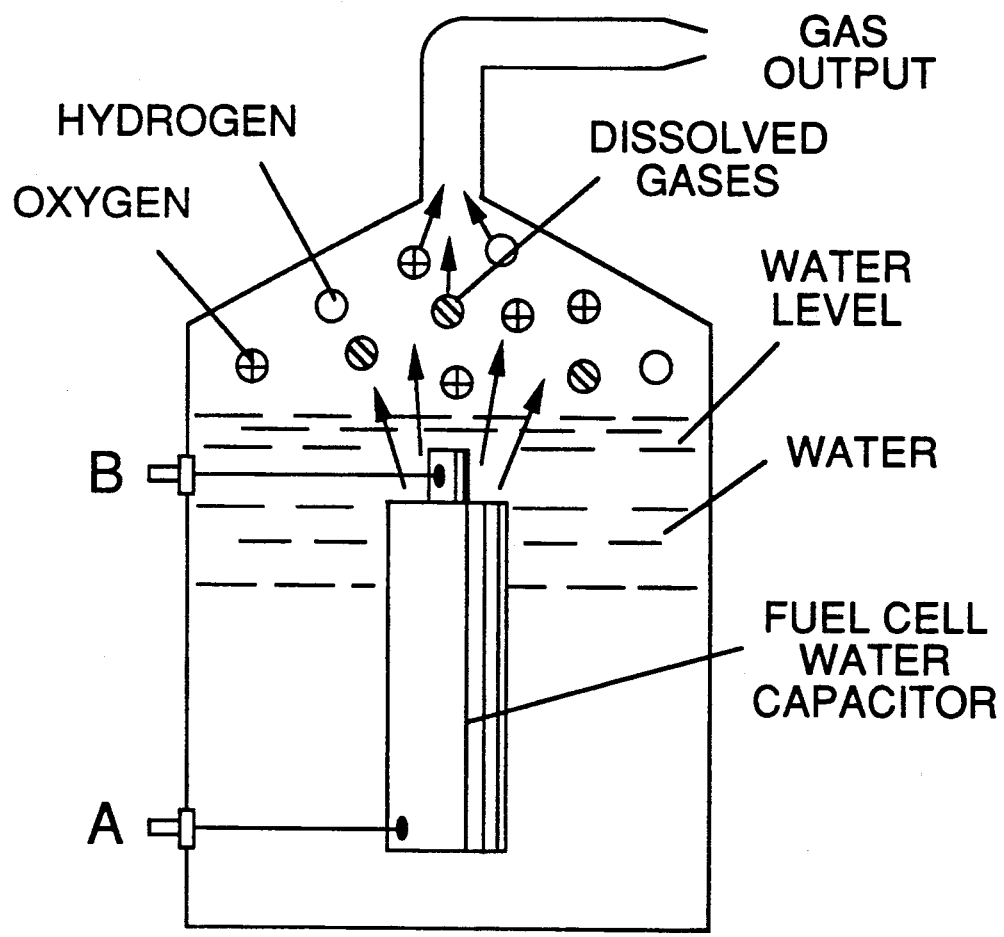
FIG. 3 shows a perspective of a "water capacitor" element used in the fuel cell circuit.

A single cell, or a battery of cells such as shown in FIG. 3, provides a fuel gas source for stages after the first stage. The fuel gas is activated by electromagnetic waves, and electrically charged gas ions of hydrogen and oxygen (of opposite polarity) are expelled from the cascaded cells 2, 3, etc. shown in FIG. 4. The circuit of FIG. 9 may be utilized as a source of ionizing energy for the gases. The effect of cascading successively increases the voltage stimulation level of the released gases, which then are directed to the final injector assembly 4. In the injector assembly, gas ions are stimulated to a yet higher energy level. The gases are continually exposed to a pulsating laser or other electromagnetic wave energy source together with a high intensity oscillating voltage field that occurs within the cell between electrodes or conductive plates of opposite electrical polarity. A preferred construction material for the plates is a stainless steel T-304 which is non-chemically reactive with water, hydrogen, or oxygen. An electrically conductive material which is insert in the fluid environment is a desirable material of construction for the electrical field producing plates, through which field the gas stream of activated particles passes. Gas ions of opposite electrical charges reach and maintain a critical energy level state. The gas ions are oppositely electrically charged and subjected to oscillating voltage fields of opposite polarity and are also subjected to a pulsating electromagnetic wave energy source. Immediately after reaching critical energy, the excited gas ions are exposed to a high temperature thermal zone in the injection cell, 4, that causes the excited gas ions to undergo gas combustion. The gas ignition triggers atomic decay and releases thermal energy, 5, with explosive force.

Figure 6A:
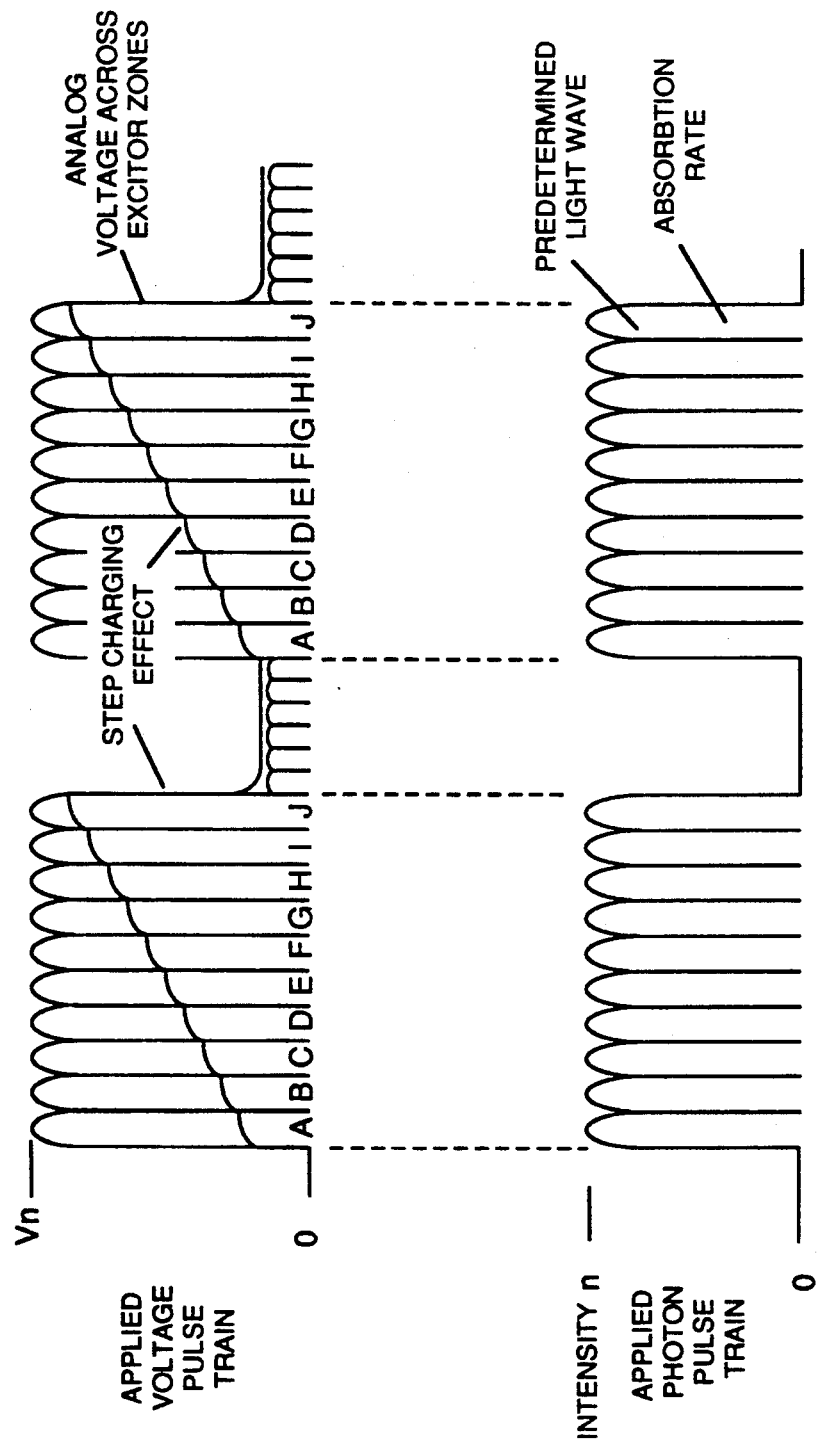
FIGS. 6A, 6B, 6C and 6D are illustrations depicting various theoretical bases for atomic phenomena expected to occur during operation of the invention herein.

Once triggered, the thermal explosive energy output is controllable by the attenuation of operational parameters. With reference to FIG. 6A, for example, once the frequency of resonance is identified, by varying applied pulse voltage to the initial water fuel cell assemblies, 2, 3, the ultimate explosive energy output is likewise varied. By varying the pulse shape and/or amplitude or pulse train sequence of the electromagnetic wave energy source, final output is varied. Attenuation of the voltage field frequency in the form of OFF and ON pulses likewise affects output of the staged apparatus. Each control mechanism can be used separately, grouped in sections, or systematically arranged in a sequential manner.

Figure 6B:
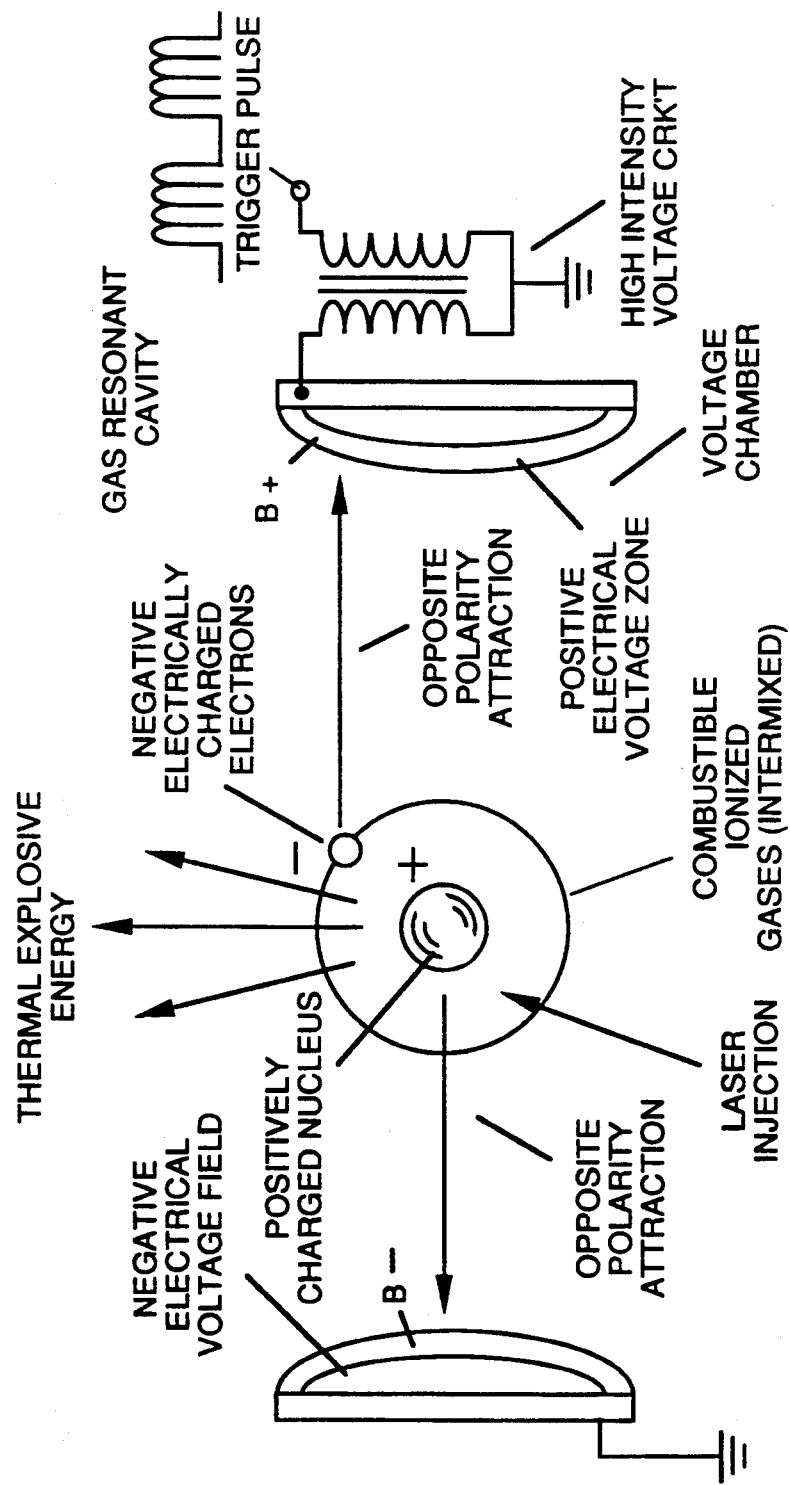
Figure 6C:
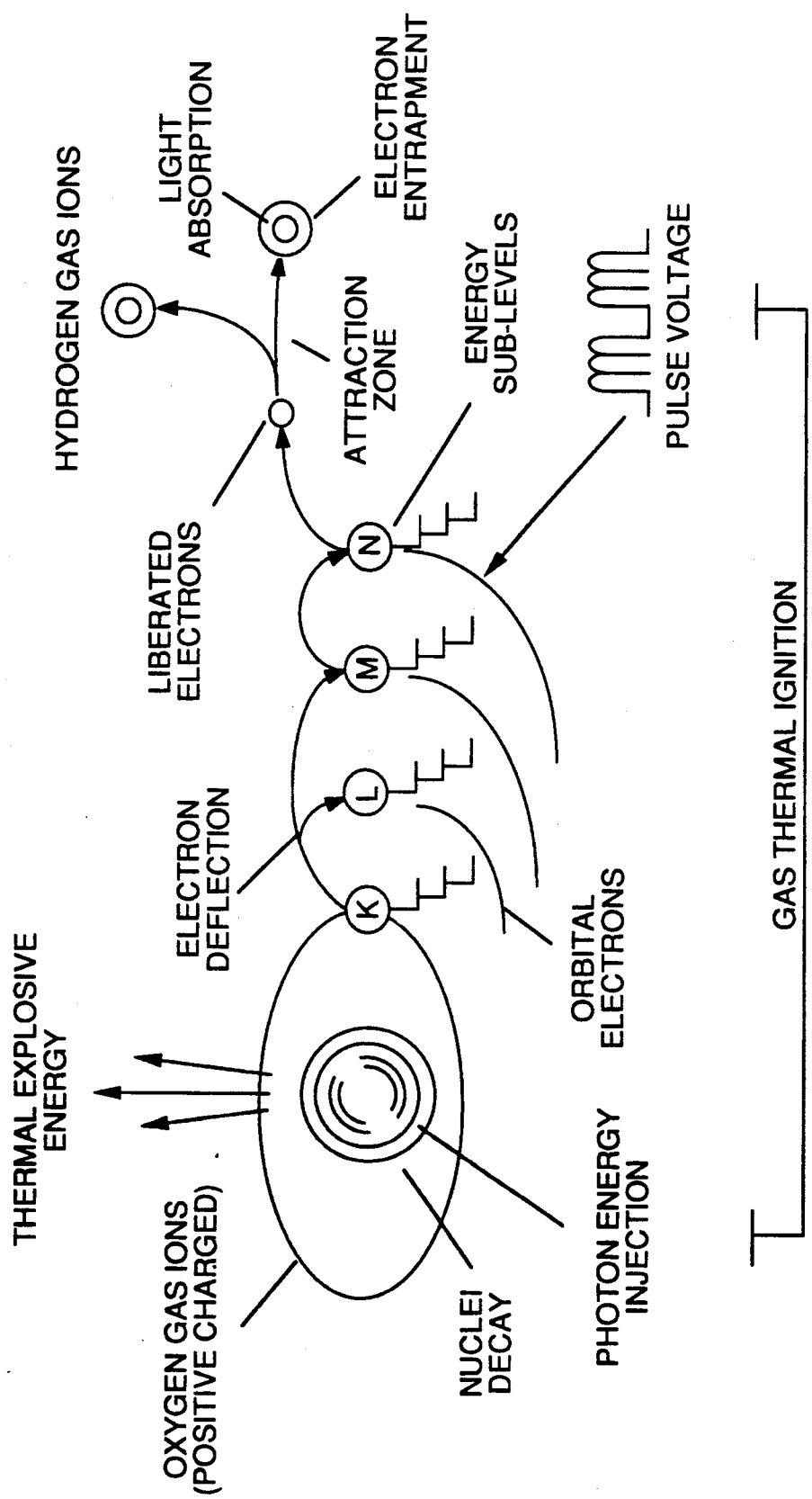
Figure 6D:
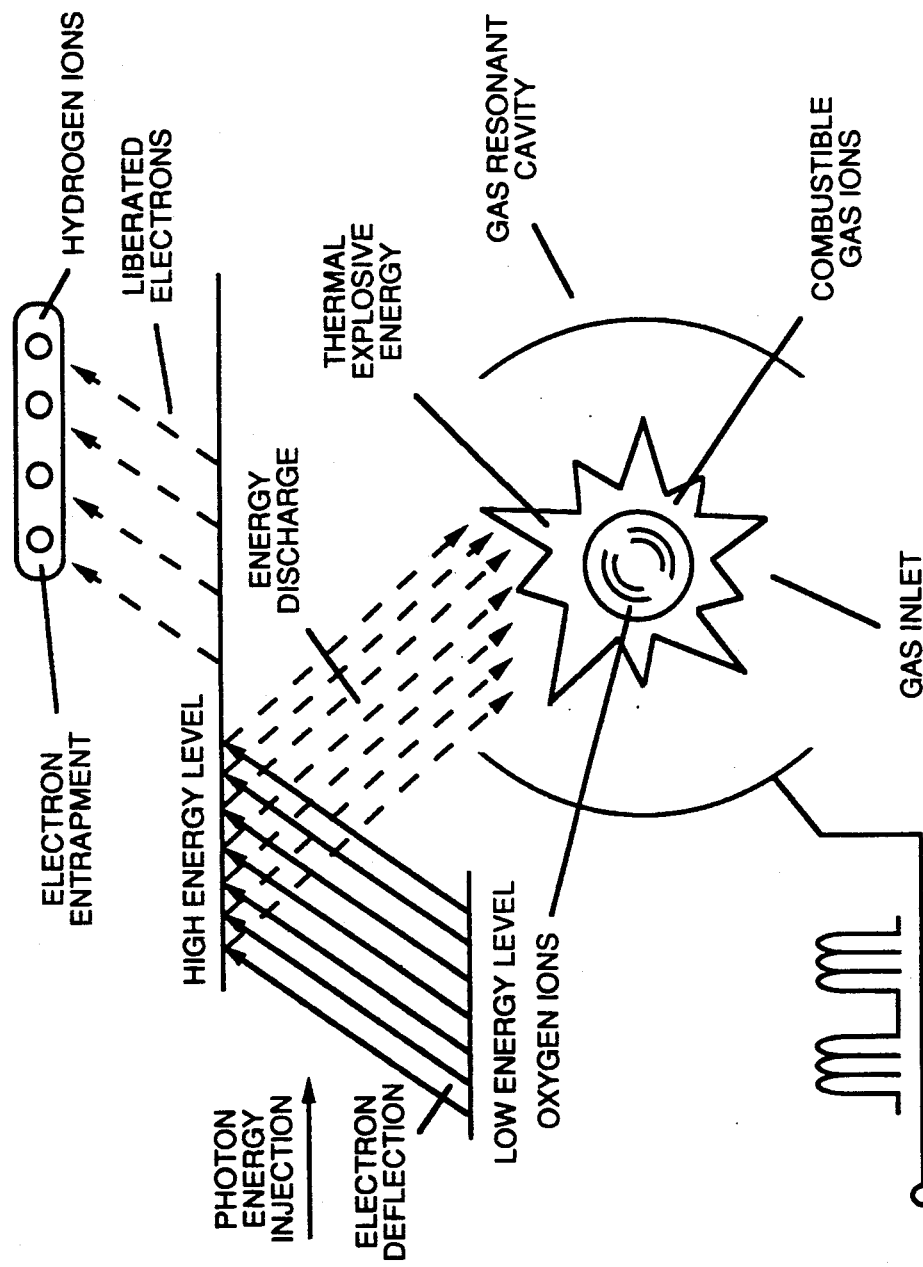
Figure 7:
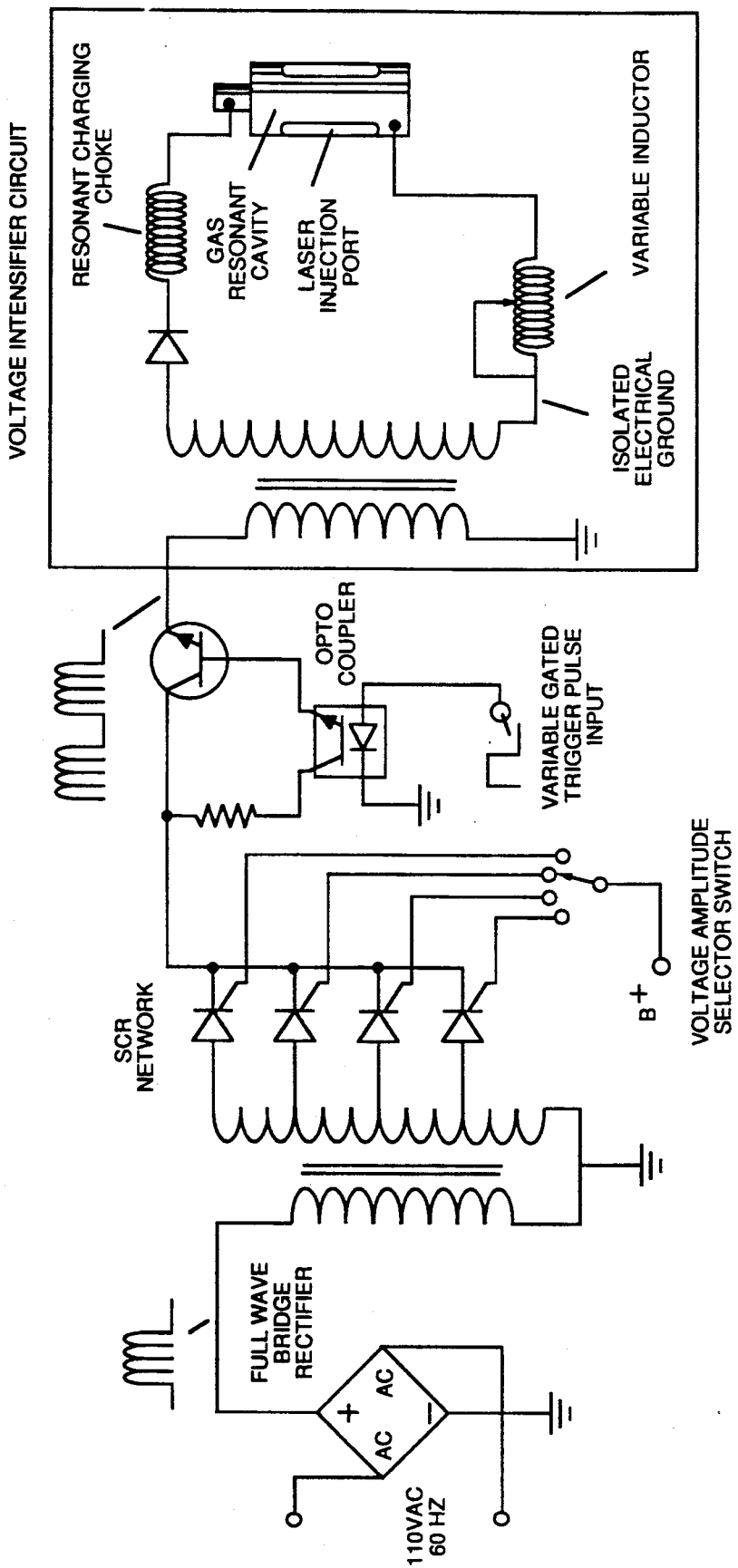
FIG. 7 is an electrical schematic of the voltage source for the gas resonant cavity.

A complete system in accordance with the present application thus includes a water fuel cell for providing a first fuel gas mixture consisting of at least a portion of hydrogen and oxygen gas. An electrical circuit of the type shown in FIG. 7 provides a pulsating, polar electric field to the gas mixture as illustrated in FIG. 6A, whereby electrons of the gas atoms are distended in their orbital fields by reason of their subjection to electrical polar forces, changing from the state conceptually illustrated by FIG. 6B to that of FIG. 6C, at a frequency such that the pulsating electric field induces a resonance with respect to electrons of the gas atoms. The energy level of the resonant electrons is thereby increased in cascading, incremental steps. A further electric field to ionize said gas atoms is applied and an electromagnetic wave energy source for subjecting the ionized gas atoms to wave energy of a predetermined frequency to induce a further electron resonance in the ion, whereby the energy level of the election is successively increased is an additional element of the apparatus as shown in FIG. 6D.

Figure 8A:
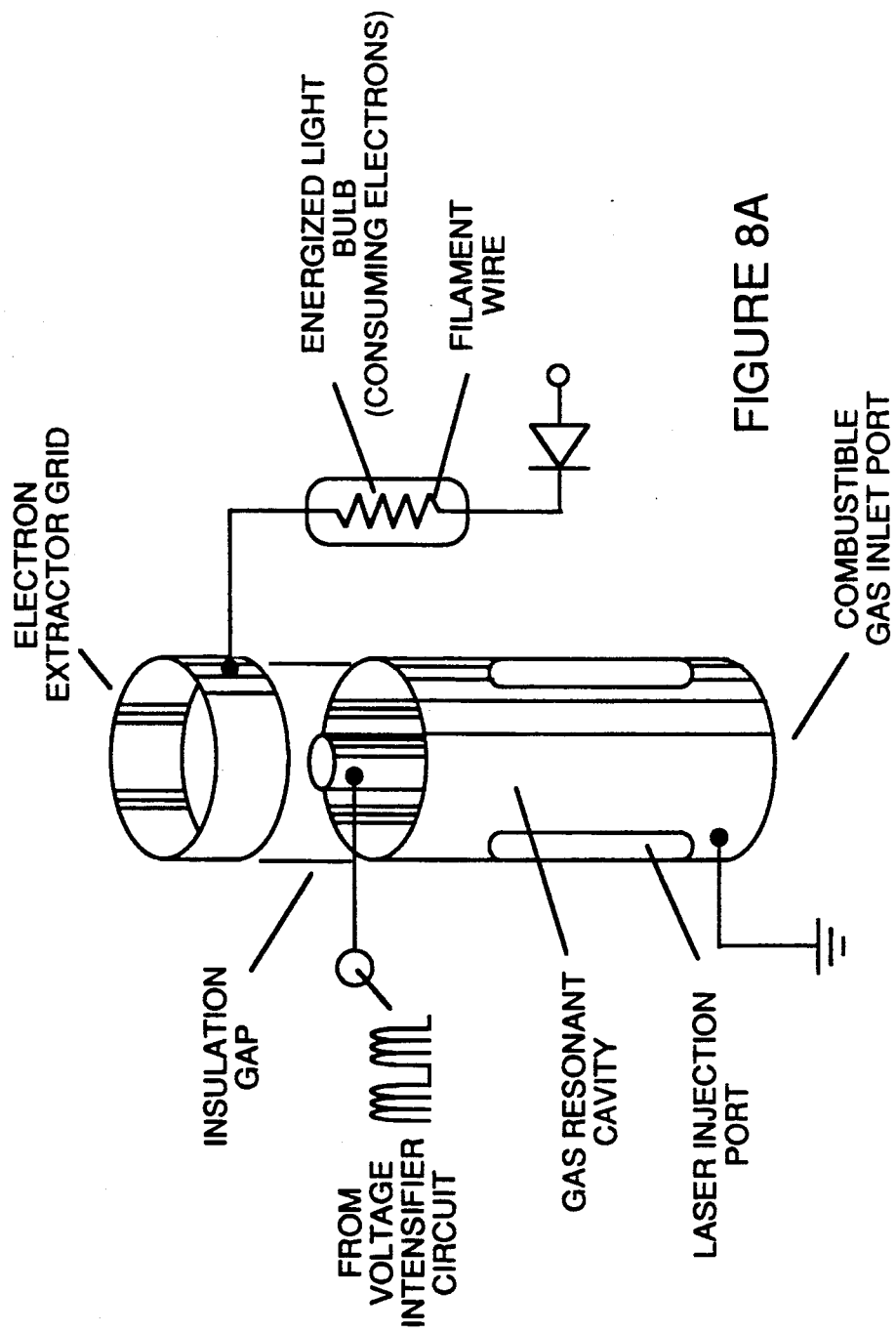
FIGS. 8A and 8B, respectively, show (A) an electron extractor grid used in the injector assemblies of FIG. 5A and FIG. 5B, and (B) the electronic control circuit for the extractor grid.
Figure 8B:
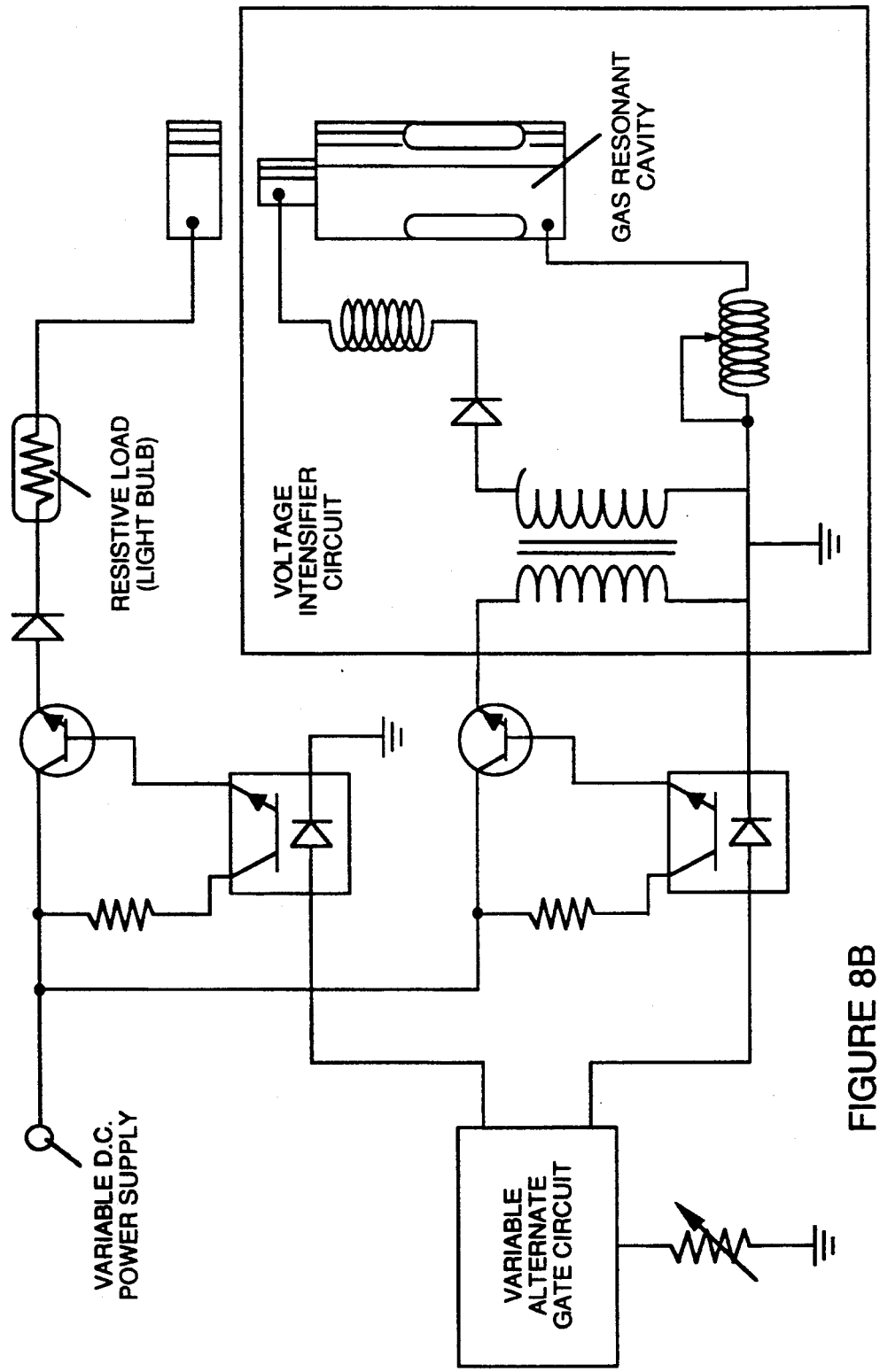

An electron sink, which may be in the form of the grid element shown in FIG. 8A, extracts further electrons from the resonating ions while such ions are in an increased energy state and destabilizes the nuclear electron configuration of the ions. The "extraction" of electrons by the sink means is coordinated with the pulsating electrical field of the resonant cavity produced by the circuit of FIG. 7, by means of an interconnected synchronization circuit, such as shown in FIG. 8B. A nozzle, 10 in FIG. 5B, or thermal lens assembly, FIG. 5C, provides the directing means in which the destabilized ions are finally thermally ignited.

As previously noted, to reach and trigger the ultimate atomic decay of the fuel cell gases at the final stage, sequential steps are taken. First, water molecules are slit into component atomic elements (hydrogen and oxygen gases) by a voltage stimulation process which also releases dissolve gases entrapped in the water. In the injector assembly, a laser produced light wave or other form of coherent electromagnetic wave energy capable of stimulating a resonance within the atomic components is absorbed by the mixture of gases (hydrogen/oxygen/ambient air gases) released by the polarization process. At this point, as shown in FIG. 6B, the individual atoms are subjected to an electric field to begin an ionization process.

The laser or electromagnetic wave energy is absorbed and causes gas atoms to lose electrons and form positively charged gas ions. The energized hydrogen atoms which, as ionized, are positively charged, now accept electrons liberated from the heavier gases and attract other negatively charged gas ions as conceptually illustrated in FIG. 6C. Positively and negatively charged gas ions are re-exposed to further pulsating energy sources to maintain random distribution of ionized atomic gas particles.

Figure 5A:
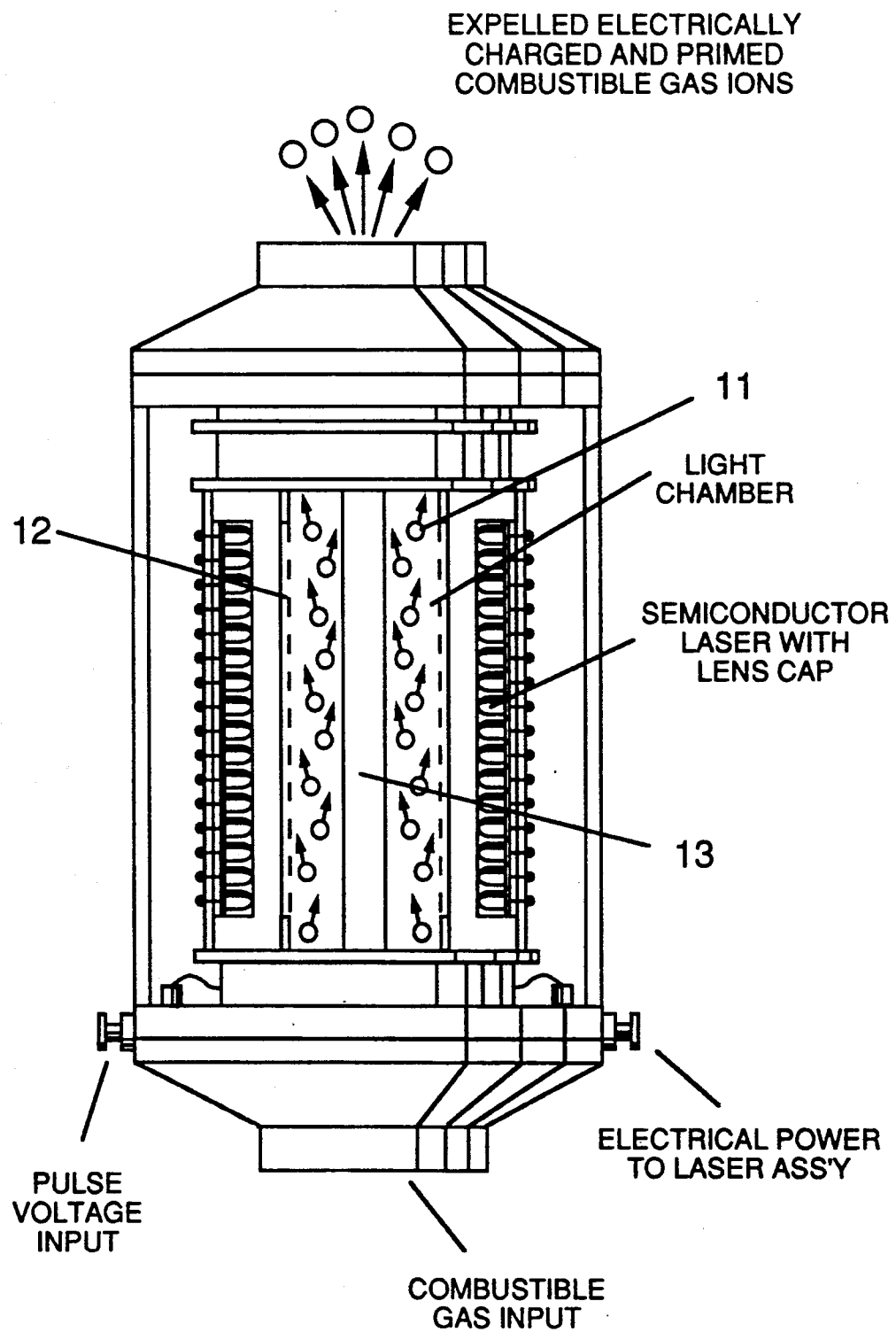
FIG. 5A shows a cross-section of a circular gas resonant cavity used in the final stage assembly of FIG. 4.
Figure 5B:
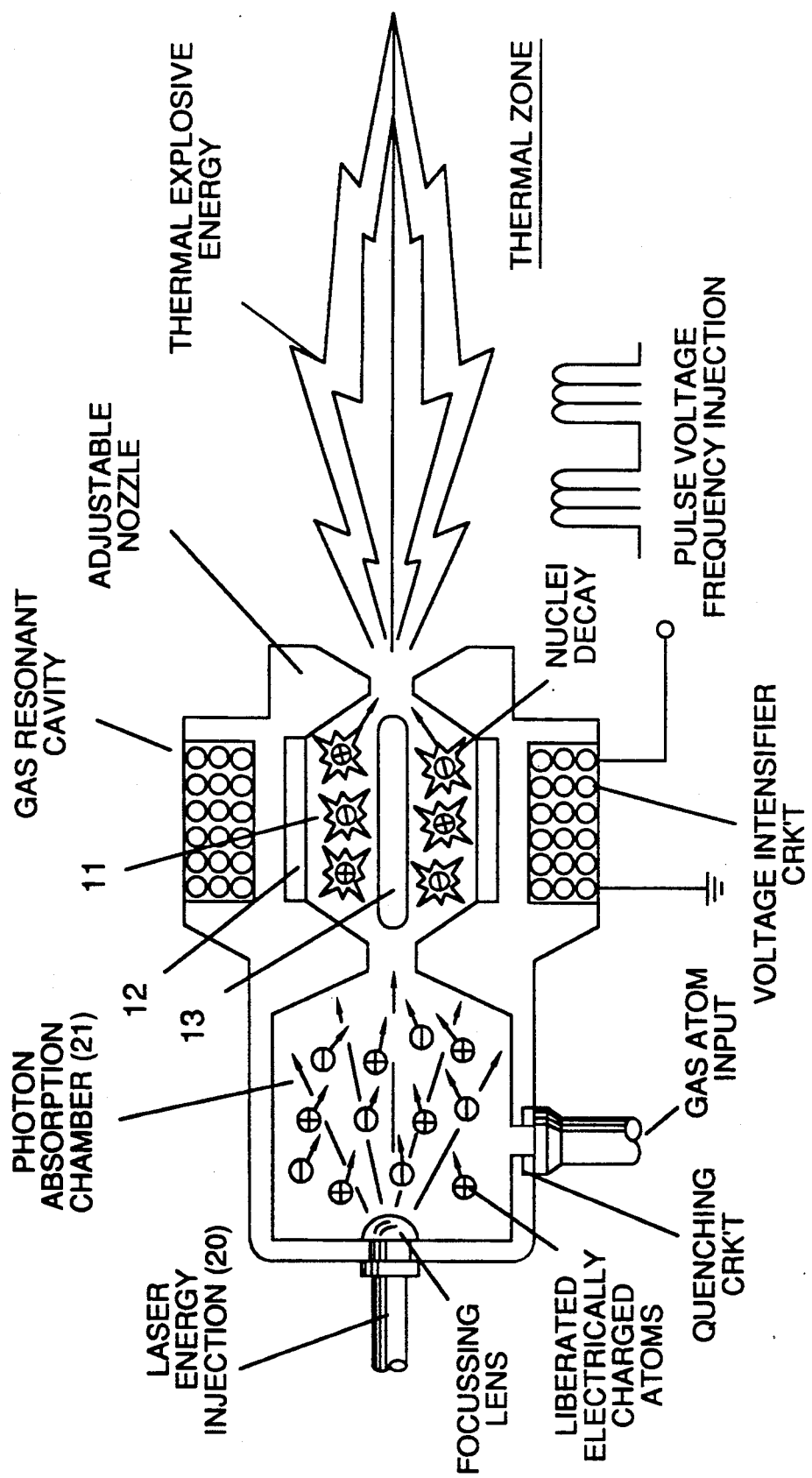
FIG. 5B shows an alternative final stage injection system useful in the apparatus of FIG. 4.
Figure 5C:
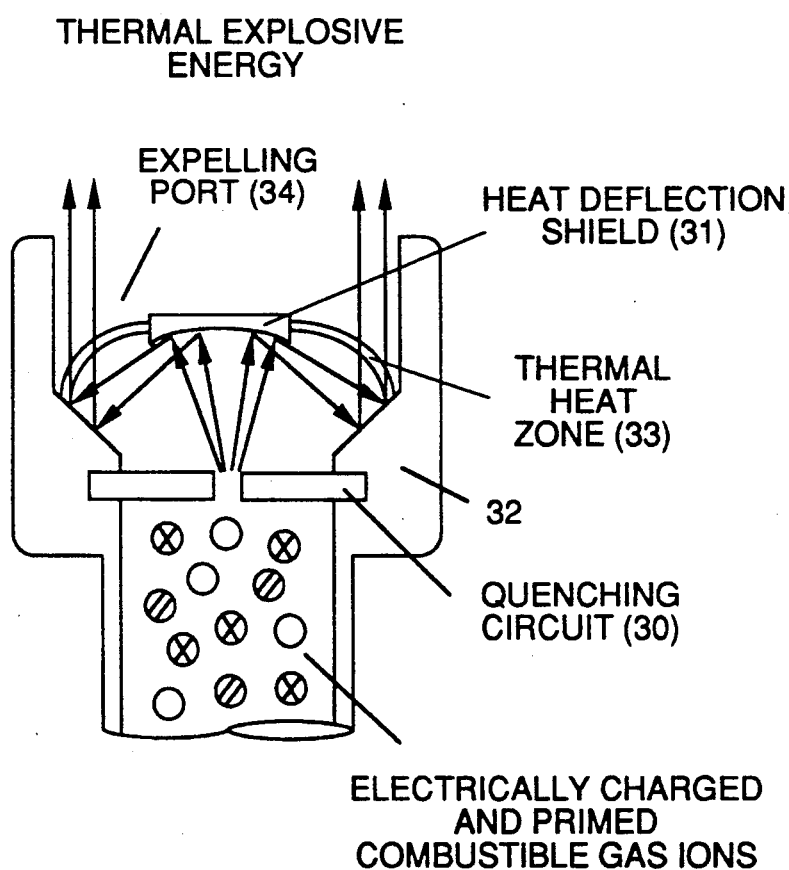
FIG. 5C shows an optical thermal lens assembly for use with either final stage of FIG. 5A or FIG. 5B.

The gas ions within the wave energy chamber are subjected to an oscillating high intensity voltage field in a chamber 11 in FIGS. 5A and 5B formed within electrodes 12 and 13 in FIGS. 5A and 5B of opposite electrical polarity to produce a resonant cavity. The gas ions reach a critical energy state at a resonant state.

At this point, within the chamber, additional electrons are attracted to said positive electrode; whereas, positively charged ions or atomic nuclei are attracted to the negative electrode. The positive and negative attraction forces are co-ordinate and operate on said gas ions simultaneously; the attraction forces are non-reversible. The gas ions experience atomic component deflection approaching the point of electron separation. At this point electrons are extracted from the chamber by a grid system such as shown in FIG. 5A. The extracted electrons are consumed and prevented from re-entering the chamber by a circuit such as shown in FIG. 8B. The elongated gas ions are subjected to a thermal heat zone to cause gas ignition, releasing thermal energy with explosive force. During ionic gas combustion, highly energized and stimulated atoms and atom nuclei collide and explode during thermal excitation. The hydrogen fracturing process occurring sustains and maintains a thermal zone, at a temperature in excess of normal hydrogen/oxygen combustion temperature, to wit, in excess of 2500° F. To cause and maintain atomic elongation depicted in FIG. 6C before gas ignition, a voltage intensifier circuit such as shown in FIG. 7 is utilized as a current restricting voltage source to provide the excitation voltage applied to the resonant cavity. At the same time the interconnected electron extractor circuit, FIG. 8B, prevents the reintroduction of electrons back into the system. Depending on calculated design parameters, a predetermined voltage and frequency range may be designed for any particular application or physical configuration of the apparatus.

In the operation of the assembly, the pulse train source for the gas resonant cavity shown at 2 and 3 in FIG. 4 may be derived from a circuit such as shown in FIGS. 2, 7 or 9, and such cavity circuits may be in sequence to provide a cascading energy input. It is necessary in the final electron extraction that the frequency with which electrons are removed from the system by sequenced and synchronized with the pulsing of the gas resonant cavity. In the circuit of FIG. 8B, the coordination of synchronization of the circuit with the circuit of FIG. 7 may be achieved by interconnecting point "A" of the gate circuit of FIG. 8B to coordinate point "A" of the pulsing circuit of FIG. 7.

The circuit shown in FIG. 9 enhances the voltage potential across the resonant charging choke coils during pulsing operations and restricts amp flow by allowing an external electromagnetic pulsing field, F, derived from the primary coil A being energized to transverse the coil windings D and E being energized by the incoming pulse train Ha xxx Hn, through switching diode G. The external pulse field, F and the incoming pulse-train Ha xxx Hn, are sequentially the same, allowing resonant action to occur, restricting amp flow while allowing voltage intensity to increase to stimulate the electrical polarization process, the gas ionization process and the electron extraction process. The voltage intensifier circuit of FIG. 9 prevents electrons from entering into those processes.

Together, the hydrogen injector assembly 4 and the resonant cavity assemblies 2, 3 form a gas injector fuel cell which is compact, light in weight and design variable. For example, the hydrogen injector system is suited for automobiles and jet engines. Industrial applications require larger systems. For rocket engine applications, the hydrogen gas injector system is positioned at the top of each resonant cavity arranged in a parallel cluster array. If resonant cavities are sequentially combined in a parallel/series array, the hydrogen injection assembly is positioned after the exits of said resonant cavities are combined.

From the outline of physical phenomena associated with the process described in Table 1, the theoretical basis of the invention considers the respective states of molecules, gases and ions derived from liquid water. Before voltage stimulation, water molecules are randomly dispersed throughout water within a container. When a unipolar voltage pulse train such as shown in FIG. 6A (53a xxx 53n) is applied, an increasing voltage potential is induced in the molecules, gases and/or ions in a linear, step-like charging effect. The electrical field of the particles within a chamber including the electrical field plates increases from a low energy state (A) to a high energy state (J) in a step manner following each pulse-train as illustrated in FIG. 6A. The increasing voltage potential is always positive in direct relationship to negative ground potential during each pulse. The voltage polarity on the plates which create the voltage fields remains constant. Positive and negative voltage "zones" are thus formed simultaneously.

In the first stage of the process described in Table 1, because the water molecule naturally exhibits opposite electrical fields in a relatively polar configuration (the two hydrogen atoms are positively electrically charged relative to the negative electrically charged oxygen atom), the voltage pulse causes initially randomly oriented water molecules in the liquid state to spin and orient themselves with reference to positive and negative poles of the voltage fields applied. The positive electrically charged hydrogen atoms of said water molecule are attracted to a negative voltage field; while, at the same time, the negative electrically charged oxygen atoms of the same water molecule are attracted to a positive voltage field. Even a slight potential difference applied to the inert, conductive plates of a containment chamber will initiate polar atomic orientation within the water molecule based on polarity differences.

When the potential difference applied causes the orientated water molecules to align themselves between the conductive plates, pulsing causes the voltage field intensity to be increased in accordance with FIG. 6A. As further molecular alignment occurs, molecular movement is hindered. Because the positively charged hydrogen atoms of said aligned molecules are attracted in a direction opposite to the negatively charged oxygen atoms, a polar charge alignment or distribution occurs within the molecules between said voltage zones, as shown in FIG. 6B. And as the energy level of the atoms subjected to resonant pulsing increases, the stationary water molecules become elongated as shown in FIG. 6C. Electrically charged nuclei and electrons are attracted toward opposite electrically charged voltages zones—disrupting the mass equilibrium of the water molecule.

In the first stage, as the water molecule is further exposed to a potential difference, the electrical force of attraction of the atoms within the molecule to the electrodes of the chamber also increases in intensity. As a result, the covalent bonding between said atoms which forms the molecule is weakened and ultimately terminated. The negatively charged electron is attracted toward the positively charged hydrogen atoms, while at the same time, the negatively charged oxygen atoms repel electrons.

Once the applied resonant energy caused by pulsation of the electrical field in the cavities reaches a threshold level, the disassociated water molecules, now in the form of liberated hydrogen, oxygen, and ambient air gases begin to ionize and lose or gain electrons during the final stage in the injector assembly. Atom destabilization occurs and the electrical and mass equilibrium of the atoms is disrupted. Again, the positive field produced within the chamber or cavity that encompasses the gas stream attracts negatively charged ions while the positively charged ions (and/or hydrogen nuclei) are attracted to the negative field. Atom stabilization does not occur because the pulsating voltage applied is repetitive without polarity change. A potential of approximately several thousand volts triggers the ionization state.

As the ionized particles accumulate within said chamber, the electrical charging effect is again an incremental stepping effect that produces an accumulative increased potential while, at the same time, resonance occurs. The components of the atom begin to "vibrate" at a resonant frequency such that an atomic instability is created. As shown in k FIG. 6D, a high energy level is achieved, which then collapses resulting in the release of thermal explosive energy. Particle impact occurs when liberated ions in a gas are subjected to further voltage. A longitudinal cross section of a gas resonant cavity is shown in FIG. 5A. To promote gas ionization, electromagnetic wave energy such as a laser or photon energy source of a predetermined wave length and pulse-intensity is directed to and absorbed by the ions forming said gas. In the device of FIG. 5A, semiconductor optical lasers 20a–20p, 20xxx surround the gas flow path. In the device of FIG. 5B, photo energy 20 is injected into a separate absorption chamber 21. The incremental stimulation of nuclei to a more highly energized state by electromagnetic wave energy causes electron deflection to a higher orbital state. The pulse rate as well as intensity of the electromagnetic wage source is varied to match the absorption rate of ionized particles to produce the stepped incremental increase in energy. A single laser coupled by means of fiber optic light guides is an alternative to the plurality of lasers shown in FIG. 5B. Continued exposure of the gas ions to different forms of wave energy during voltage stimulation maintains individual atoms in a destabilized state and prevents atomic stabilization.

The highly energized gas ions are thermally ignited when said combustible gas ions pass from injector 4 and enter into and pass through a nozzle, 10 in FIG. 5B, or an optical thermal lens assembly such as shown in FIG. 5C. In FIG. 5C, the combustible gas ions are expelled through and beyond a quenching circuit, 30, and reflected by lenses, 31 and 32, back and forth through a thermal heat zone, 33, prior to atomic breakdown beyond exiting through a final port, 34. A quenching circuit is a restricted orifice through which the particle stream passes such that flashback does not occur. The deflection shield or lens, 31, superheats beyond 3,000° F. and the combustible gas ions passing through said exiting-ports are regulated to allow a gas pressure to form inside said thermal zone. The energy yield is controlled by varying the applied voltage, or pulse-train since said thermal-lens assembly is self-adjusting to the flow-rate of said ionized and primed gases. The combustible ionic gas mixture is composed of hydrogen, oxygen, and ambient air gases. The hydrogen gas provides the thermal explosive force, the oxygen atoms aid the gas thermal ignition, and the ambient air gases retard the gas thermal ignition process to a controllable state. As the combustible gas mixture is exposed to a voltage pulse train, the stepped increasing voltage potential cases said moving gas atoms to become ionized (losing or gaining electrons) and changes the electrical and mass equilibrium of said atoms. Gases that do not undergo the gas ionization process may accept the liberated electrons (electron entrapment) when exposed to light or photon stimulation. The electron extractor grid circuit, FIGS. 8A and 8B, is applied to the assembly of FIG. 5A or FIG. 5B, and restricts electron replacement. The extractor grid, 56, is applied adjacent to electric field producing members, 44 and 45, within the resonant cavity. The gas ions incrementally reach a critical-state which occurs after a high energy resonant state. At this point the atoms no longer tolerate the missing electrons, the unbalanced electrical field, and the energy stored in the nucleus. Immediate collapse of the system occurs and energy is released as the atoms decay into thermal explosive energy.

The repetitive application of a voltage pulse train (A through J of FIG. 6A) incrementally achieves the critical state of said gas ions. As the gas atoms or ions (1a xxx 1n) shown in FIG. 6C become elongated during electron removal, electromagnetic wave energy of a predetermined frequency and intensity is injected. The wave energy absorbed by the stimulated gas nuclei and electrons causes further destabilization of the ionic gas. The absorbed energy from all sources causes the gas nuclei to increase in energy state, and induces the ejection of electrons from the nuclei.

To further stimulate the electron entrapment process beyond the atomic level (capturing the liberated electrons during the hydrogen fracturing process) the electron extractor grid (as shown in FIG. 8A) is placed in spaced relationship to the gas resonant cavity structure shown in FIG. 5A. The electron extractor grid is attached to an electrical circuit (such as shown in FIG. 8B) that allows electrons to flow to an electrical load, 55, when a positive electrical potential is placed on the opposite side of said electrical load. The electrical load may be a typical power consuming device such as a light bulb or resistive heat producing device. As the positive electrical potential is switched on or pulse-applied, the negative charged electrons liberated in the gas resonant cavity are drawn away and enter into resistive load where they are consumed and released at heat or light energy. The consuming electrical circuit can be directly connected to the gas resonant cavity positive electrical voltage zone. The incoming positive wave form applied to resonant cavity voltage zone through a blocking diode is synchronized with the pulse train applied to the gas resonant cavity by the circuit of FIG. 7 via alternate gate circuit. As one pulse train is gated "ON", the other pulse train is switched "OFF." A blocking diode directs the electron flow to said electrical load while resistive wire prevents voltage leakage during pulse train "ON" time.

The electron extraction process is maintained during gas flow-rate change by varying the trigger pulse rate in relationship to applied voltage. The electron extraction process also prevents spark-ignition of the combustible gases traveling through the gas resonant cavity because electron build-up and potential sparking is prevented.

In an optical thermal lens assembly or thrust-nozzle, such as shown in FIG. 5C, destabilized gas ions (electrically and mass unbalanced gas atoms having highly energized nuclei) can be pressurized during spark-ignition. During thermal interaction, the highly energized and unstable hydrogen gas nuclei collide with the highly energized and unstable oxygen gas nuclei and produce thermal explosive energy beyond the gas burning stage. Other ambient air gases and ions not otherwise consumed limit the thermal explosive process.

Variations of the process and apparatus may be evident to those skilled in the art.

What is claimed is:

1. In an apparatus for obtaining the release of a gas mixture including hydrogen and other dissolved gases entrapped in water, from water, the improvement consisting of a resonant electronic circuit in operative relationship with the water in which the dielectric property of water determines the resonance of the circuit.

2. The apparatus of claim 1 in which the resonant circuit includes a resonant charging choke.

3. The apparatus of claim 1 in which water is included as a dielectric between conductive members that form a capacitor in the resonant circuit.

4. A method of obtaining thermal energy from water, consisting of:
(A) providing a capacitor, within which water is included as a dielectric, in a resonant charging choke circuit that includes an inductance in series with the capacitor;
(B) subjecting the capacitor to a pulsating, unipolar electric field in which the polarity does not pass beyond an arbitrary ground, whereby the water molecules within the capacitor are subjected to a charge of the same polarity;
(C) further subjecting the water in said capacitor to said pulsating electric field to achieve a pulse frequency such that the pulsating electric field induces a resonance within the water molecule;
(D) continuing the application of the pulsing frequency to the capacitor after resonance occurs so that the energy level within the molecule is increased in cascading incremental steps in proportion to the number of pulses;
(E) maintaining the charge of said capacitor during the application of the pulsing field, whereby the co-valent electrical bonding of the hydrogen and oxygen atoms within said molecules is destabilized, such that the force of the electrical field applied within the molecule exceeds the bonding force of the molecule, and hydrogen and oxygen atoms are liberated from the molecule as elemental gases;
(F) collecting said hydrogen and oxygen gases, and any other gases that were formerly dissolved within the water
(G) subjecting the collected gas mixture to a pulsating, polar electric field whereby electrons of the gas atoms are distended in their orbital fields by reason of their subjection to electrical polar forces, at a frequency such that the pulsating electric field includes a resonance with respect to an electron of the gas atom;
(H) cascading said gas atoms with respect to the pulsating electric field such that the energy level of the resonant electron is increased in cascading incremental steps;
(I) ionizing said gas atoms;
(J) subjecting the ionized gas atoms to electromagnetic wave energy having a predetermined frequency to induce a further election resonance in the ion, whereby the energy level of the electron is successively increased;
(K) extracting further electrons from the resonating ions while such ions are in an increased energy state to destabilize the nuclear and electron configuration of said ions; and
(L) subjecting the destabilized ions to thermal ignition.

5. The apparatus of claim 2 in which water is included as a dielectric between conductive members that form a capacitor in the resonant circuit.

6. An apparatus in accordance with claim 1 or claim 2 or claim 3 or claim 5 in which the gas mixture released is collected and utilized as a source of thermal energy, and including further successively interconnected:
(A) means for collecting the gas mixture released in the apparatus;
(B) means for providing a pulsating, polar electric field to the gas mixture, whereby electrons of the gas atoms are distended in their orbital fields by reason of their subjection to electrical polar forces, at a frequency such that the pulsating electric field induces a resonance with respect to an electron of the gas atom; and the energy level of the resonant electron is increased in cascading, incremental steps; and
(C) means for providing a further electric field to ionize said gas atoms;
said further means being connected to an electromagnetic wave energy source for subjecting the ionized gas atoms to wave energy of a predetermined frequency to induce a further election resonance in the ion, whereby the energy level of the electron is further successively increased; and
(D) an electron sink for extracting electrons from the resonanting ions while such ions are in an increased energy state to destabilize the nuclear and electron configuration of said ions;
(E) a control means for directing particle flow in a continuous manner through the electric fields, wave energy source and electron sink to a final orifice at which the destabilized ions exit from the apparatus; and
(F) a terminal orifice at which the said ions exit from the apparatus.

7. An apparatus in accordance with claim 1 or claim 2 or claim 3 or claim 5 including means for collecting the gas mixture released from the water.

8. An apparatus in accordance with claim 7 including means for directing the gas mixture to a combustion locus.

9. The apparatus of claim 8 in which a flame is produced at the combustion locus.

10. The apparatus of claim 8 in which an explosion is produced at the combustion locus.

11. The apparatus of claim 8 in which the combustion locus is in an automobile.

12. The apparatus of claim 8 in which the combustion locus is in a jet engine.

* * * * *